United States Patent
Lu et al.

(10) Patent No.: US 12,376,170 B2
(45) Date of Patent: Jul. 29, 2025

(54) CONFIGURATION RESET METHOD AND APPARATUS, AND TERMINAL DEVICE

(71) Applicant: GUANGDONG OPPO MOBILE TELECOMMUNICATIONS CORP., LTD., Guangdong (CN)

(72) Inventors: Qianxi Lu, Guangdong (CN); Zhongda Du, Guangdong (CN); Bingxue Leng, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/334,715

(22) Filed: Jun. 14, 2023

(65) Prior Publication Data

US 2023/0328825 A1  Oct. 12, 2023

Related U.S. Application Data

(63) Continuation of application No. PCT/CN2020/136726, filed on Dec. 16, 2020.

(51) Int. Cl.
*H04W 76/15* (2018.01)
*H04W 92/18* (2009.01)

(52) U.S. Cl.
CPC ............ *H04W 76/15* (2018.02); *H04W 92/18* (2013.01)

(58) Field of Classification Search
CPC ............................ H04W 76/15; H04W 92/18
See application file for complete search history.

(56) References Cited

U.S. PATENT DOCUMENTS

| | | | |
|---|---|---|---|
| 2018/0098370 A1* | 4/2018 | Bangolae | H04W 88/04 |
| 2018/0124650 A1 | 5/2018 | Park | |
| 2019/0149279 A1 | 5/2019 | Lee | |
| 2019/0174533 A1 | 6/2019 | Lee | |
| 2019/0373514 A1 | 12/2019 | Park | |
| 2020/0029340 A1 | 1/2020 | He et al. | |

(Continued)

FOREIGN PATENT DOCUMENTS

| | | |
|---|---|---|
| CN | 110536262 A | 12/2019 |
| CN | 111417215 A | 7/2020 |

(Continued)

OTHER PUBLICATIONS

3GPP TSG-RAN WG2 Meeting#109 electronic R2-2001418, Feb. 24-Mar. 6, 2020, Agenda Item: 6.4.2.2, Source: Huawei, HiSilicon, Title: Remaining issue on sidelink AS configuration, Document for: Discussion and Decision. (4 pages).

(Continued)

*Primary Examiner* — Parth Patel
(74) *Attorney, Agent, or Firm* — PERKINS COIE LLP

(57) ABSTRACT

A method for resetting configuration includes that: a first terminal device performs sidelink communication with a second terminal device using a first configuration; receives a second configuration and reset configuration indication information from the second terminal device; and releases the first configuration according to the reset configuration indication information, and performs sidelink communication with the second terminal device using the second configuration. Provided are also apparatuses for resetting configuration applied to a terminal device and a second terminal device.

10 Claims, 11 Drawing Sheets

(56) References Cited

U.S. PATENT DOCUMENTS

| | | | |
|---|---|---|---|
| 2020/0260353 A1 | 8/2020 | Xu et al. | |
| 2020/0322939 A1* | 10/2020 | Cao | H04W 72/02 |
| 2020/0351937 A1 | 11/2020 | Lee | |
| 2021/0022048 A1 | 1/2021 | Park | |
| 2021/0258922 A1* | 8/2021 | Xiao | H04W 72/02 |
| 2021/0392472 A1* | 12/2021 | Zhou | H04L 1/1896 |
| 2022/0015133 A1* | 1/2022 | Fong | H04W 72/1263 |
| 2022/0104250 A1 | 3/2022 | Lee | |
| 2022/0217575 A1* | 7/2022 | Wang | H04W 76/14 |
| 2022/0264678 A1* | 8/2022 | Jung | H04W 76/27 |
| 2022/0360374 A1* | 11/2022 | Yoshioka | H04L 1/1896 |
| 2022/0361283 A1* | 11/2022 | Liu | H04W 52/0235 |
| 2022/0393802 A1* | 12/2022 | Zhao | H04L 1/1887 |
| 2022/0394700 A1* | 12/2022 | Ko | H04W 56/0045 |
| 2023/0062341 A1* | 3/2023 | Zhou | H04W 76/28 |
| 2023/0067429 A1* | 3/2023 | Liu | H04W 36/0055 |
| 2023/0128179 A1 | 4/2023 | Park | |
| 2023/0171795 A1* | 6/2023 | Di Girolamo | H04W 72/51 370/329 |
| 2023/0262656 A1* | 8/2023 | Yu | H04W 76/27 455/458 |

FOREIGN PATENT DOCUMENTS

| | | |
|---|---|---|
| CN | 111565376 A | 8/2020 |
| WO | 2020017939 A1 | 1/2020 |

OTHER PUBLICATIONS

3GPP TSG-RAN WG2 #107bis R2-1912231, Chongqing, P.R. China, Oct. 14-18, 2019, Agenda Item: 6.4.2, Source: Spreadtrum Communications, Title: Discussion on SLRB configuration alignment, Document for: Discussion and Decision. (3 pages).

International Search Report in the international application No. PCT/CN2020/136726, mailed on Sep. 23, 2021. (7 pages).

Written Opinion of the International Search Authority in the international application No. PCT/CN2020/136726, mailed on Sep. 23, 2021. (8 pages).

3GPP TSG RAN Meeting #80 RP-181429, La Jolla, USA, Jun. 11-14, 2018, Source: Vodafone, Title: New SID: Study on NR V2X, Document for: Approval, Agenda Item: 9.1.5. (5 pages).

3GPP TS 38.331 V16.2.0 (Sep. 2020), 3rd Generation Partnership Project; Technical Specification Group Radio Access Network; NR; Radio Resource Control (RRC) protocol specification, (Release 16). (916 pages).

Supplementary European Search Report in the European application No. 20965430.0, mailed on Jan. 2, 2024. 6 pages.

InterDigital Inc., "Corrections to SUI and RRCReconfigurationSidelink", 3GPP RAN WG2 Meeting #110-e R2-2005326 Electronic, Jun. 1-Jun. 12, 2020, pp. 1-7.

InterDigital Communications, "DCI contents for SPS and resource allocation in Mode 1", 3GPP TSG-RAN WG1 Meeting #86 R1-167589, Gothenburg, Sweden, Aug. 22-26, 2016, pp. 1-3.

ZTE Corporation, "CR on TS 38.331 for miscellaneous issues for NR V2X", 3GPP TSG-RAN WG2 Meeting #111 electronic R2-2006745, Online, Aug. 17-28, 2020, pp. 1-6.

First Office Action of the Japanese application No. 2023-536477, issued on Sep. 27, 2024. 6 pages with English translation.

Supplementary European Search Report in the European application No. 24218268.1, mailed on Mar. 12, 2025. 6 pages.

First Office Action of the Indian application No. 202317046696, issued on Jan. 9, 2025. 6 pages with English translation.

\* cited by examiner

CONFIGURATION RESET METHOD AND APPARATUS, AND TERMINAL DEVICE

CROSS-REFERENCE TO RELATED APPLICATION

This is a continuation of International Patent Application No. PCT/CN2020/136726 filed on Dec. 16, 2020, the disclosure of which is hereby incorporated by reference in its entirety.

BACKGROUND

A sender and a receiver for sidelink communication are both terminal devices. When the sender switches between different coverage scenarios or different Radio Resource Control (RRC) states, access stratum configuration for the sender may change.

The change of the access stratum configuration for the sender will affect normal communication at the receiver. Therefore, how to ensure the normal communication at the receiver needs to be solved.

SUMMARY

Embodiments of the present disclosure relate to the technical field of mobile communications, and in particular to a method and an apparatus for resetting configuration, and a terminal device.

The method for resetting configuration provided by the embodiments of the present disclosure includes the following operations.

A first terminal device performs sidelink communication with a second terminal device using a first configuration. The first terminal device receives a second configuration and reset configuration indication information from the second terminal device. The first terminal device releases the first configuration according to the reset configuration indication information, and performs sidelink communication with the second terminal device using the second configuration.

The method for resetting configuration provided by the embodiments of the present disclosure includes the following operations.

A second terminal device performs sidelink communication with a first terminal device using a first configuration. The second terminal device transmits a second configuration and reset configuration indication information to the first terminal device. The reset configuration indication information is used for indicating the first terminal device to release the first configuration, and the second configuration is used for the first terminal device to perform sidelink communication with the second terminal device.

The apparatus for resetting configuration provided by the embodiments of the present disclosure is applied to a first terminal device or a second terminal device, and includes a processor and a transceiver. The processor is configured to control the transceiver to implement the above method for resetting configuration performed by the first terminal device or the above method for resetting configuration performed by the second terminal device.

BRIEF DESCRIPTION OF THE DRAWINGS

The accompanying drawings illustrated herein are used to provide further understanding of the present disclosure and constitute a part of the present disclosure, and illustrative embodiments of the present disclosure and their description are used to explain the present disclosure, but do not constitute improper limitation to the present disclosure. In the accompanying drawings.

DETAILED DESCRIPTION

The technical solution of the embodiments of the present disclosure will be described below in conjunction with the drawings in the embodiments of the present disclosure, and it will be apparent that the described embodiments are part of the embodiments of the present disclosure, but not all of them. Based on the embodiments in the present disclosure, all other embodiments obtained by those of ordinary skill in the art without creative work fall within the scope of protection of the present disclosure.

The technical solution of the embodiments of the present disclosure can be applied to various communication systems, such as long term evolution (LTE) system, LTE frequency division duplex (FDD) system, LTE time division duplex (TDD) system, 5G communication system or future communication system, etc.

Figure 1:
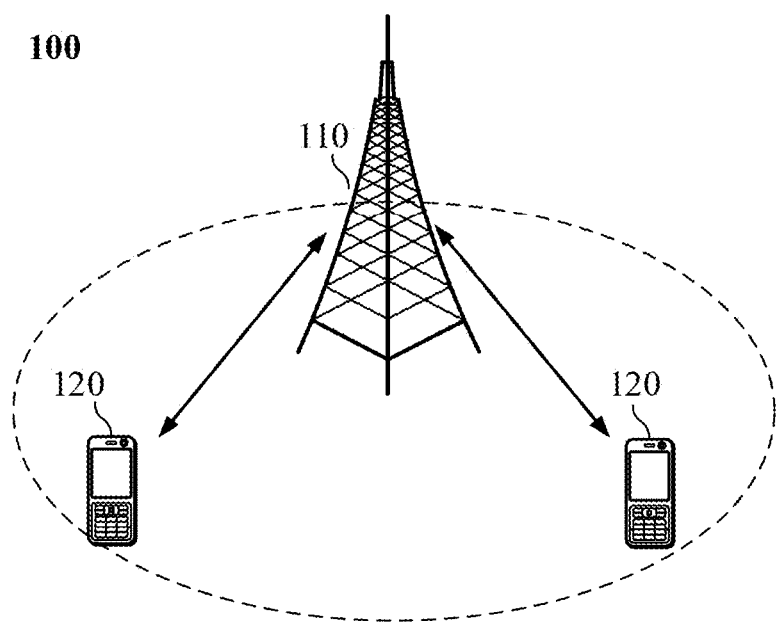
FIG. 1 is a schematic diagram of a communication system architecture provided by an embodiment of the present disclosure.

Exemplarily, a communication system 100 applied in the embodiments of the present disclosure is illustrated in FIG. 1. The communication system 100 may include a network device 110, which may be a device that communicates with a terminal 120 (or referred to as a communication terminal or a terminal). The network device 110 may provide communication coverage for a particular geographic area and may communicate with terminals located within the coverage area. Optionally, the network device 110 may be an evolution NodeB (eNB or eNodeB) in an LTE system, or a wireless controller in a cloud radio access network (CRAN), or the network device may be a mobile switching center, a relay station, an access point, an in-vehicle device, a wearable device, a hub, a switch, a bridge, a router, a network-side device in a 5G network or a network device in a future communication system, etc.

The communication system 100 also includes at least one terminal 120 located within the coverage area of the network device 110. "Terminal" as used herein includes, but is not limited to, a connection via a wired line, such as via a public switched telephone network (PSTN), a digital subscriber line (DSL), a digital cable, a direct cable connection; and/or another data connection/network; and/or via a wireless interface such as a cellular network, a wireless local area network (WLAN), a digital television network such as a DVB-H network, a satellite network, an AM-FM broadcast transmitter; and/or a device of another terminal arranged to receive/send a communication signal; and/or Internet of Things (IoT) devices. A terminal arranged to communicate through a wireless interface may be referred to as "a wireless communication terminal", "a wireless terminal", or "a mobile terminal". Examples of mobile terminals include, but are not limited to satellite or cellular phones; personal communications system (PCS) terminals that can combine cellular radio telephones with data processing, facsimile, and data communication capabilities; PDA which may include radio telephones, pagers, Internet/Intranet access, Web browsers, notebooks, calendars, and/or global positioning system (GPS) receivers; and conventional laptop and/or handheld receivers or other electronic devices including radio telephone transceivers. The terminal may refer to an access terminal, user equipment (UE), a subscriber unit, a subscriber station, a mobile station, a mobile platform, a remote station, a remote terminal, a mobile device, a user terminal, a terminal, a wireless communication device, a user agent, or a user device. The access terminal may be a cellular phone, a cordless phone, a session initiation protocol (SIP) telephone, a wireless local loop (WLL) station, a personal digital assistant (PDA), a handheld device with wireless communication function, a computing device or other processing device connected to wireless modem, an in-vehicle device, a wearable device, a terminal in 5G network or a terminal in the future evolved public land mobile network (PLMN), etc.

In some embodiments, device to device (D2D) communication may be performed between the terminals 120.

In some embodiments, the 5G communication system or 5G network may also be referred to as a new radio (NR) system or an NR network.

FIG. 1 exemplarily illustrates a network device and two terminals. In some embodiments, the communication system 100 may include multiple network devices and other numbers of terminals may be included within the coverage of each network device, which is not limited by the embodiments of the present disclosure.

In some embodiments, the communication system 100 may also include other network entities such as network controllers, mobility management entities and the like, which are not limited by the embodiments of the present disclosure.

It should be understood that a device having a communication function in a network/system in the embodiments of the present disclosure may be referred to as a communication device. Taking the communication system 100 illustrated in FIG. 1 as an example, the communication device may include a network device 110 and terminals 120 having a communication function, the network device 110 and the terminals 120 may be specific devices described above and will not be described here. The communication device may also include other devices in the communication system 100 such as network controllers, mobility management entities and other network entities, which are not limited in the embodiments of the present disclosure.

It should be understood that the terms "system" and "network" of the present disclosure are often used interchangeably herein. In the present disclosure, the term "and/or" is used to describe an association relationship of associated objects, and represents that there may be three relationships. For example, A and/or B may represent the following three situations: i.e., independent existence of A, existence of both A and B and independent existence of B. In addition, the character "/" in the present disclosure generally represents that an "or" relationship is formed between the previous and next associated objects.

In order to facilitate understanding of the technical solution of the embodiments of the present disclosure, the technical solution related to the embodiments of the present disclosure is described below.

First, Device to Device (D2D)

D2D communication is based on Sidelink (SL) transmission technology, which is different from a traditional cellular system in which communication data is received or transmitted through a base station. Internet of vehicles system adopts the D2D communication (i.e., direct communication of device to device), so it has higher spectrum efficiency and lower transmission delay. For the D2D communication, Third Generation Partnership Project (3GPP) defines two transmission modes, including Mode A and Mode B. Mode A and Mode B are described below.

Figure 2A:
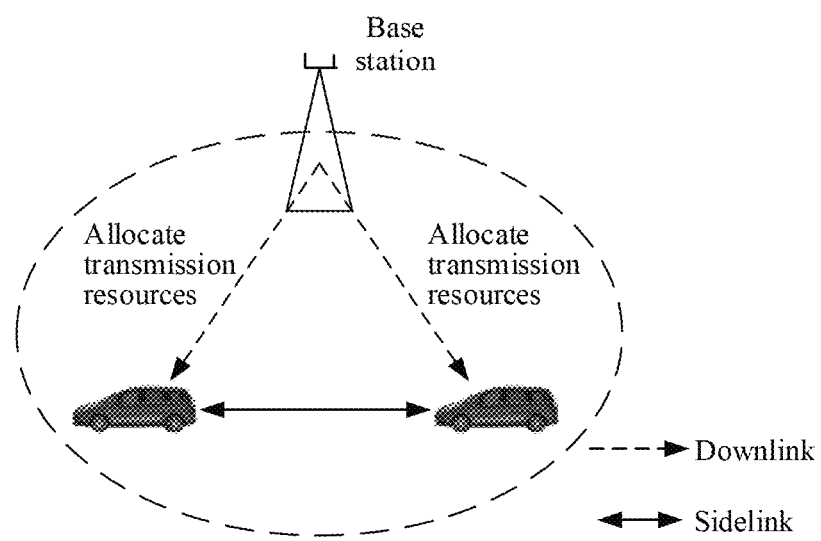
FIG. 2A is a schematic diagram of mode A provided by an embodiment of the present disclosure.

Mode A: as illustrated in FIG. 2A, transmission resources for a terminal device are allocated by a base station, and the terminal device transmits data on a sidelink according to the resources allocated by the base station. The base station may allocate resources of single transmission for the terminal device, and may also allocate resources of semi-static transmission for the terminal device.

Figure 2B:
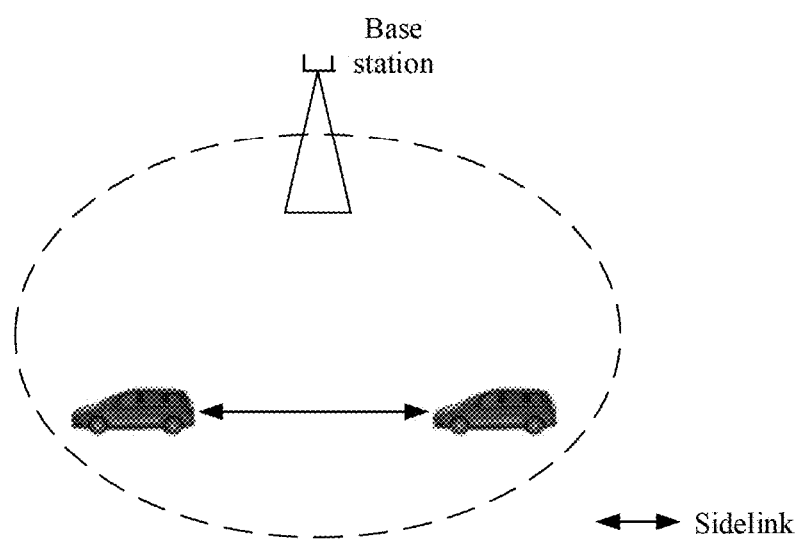
FIG. 2B is a schematic diagram of mode B provided by an embodiment of the present disclosure.

Mode B: as illustrated in FIG. 2B, the terminal device selects a resource from a resource pool to transmit data. Specifically, the terminal device may select the transmission resource from the resource pool by listening or by randomly selecting.

In 3GPP, D2D communication is studied in the following different stages:

Proximity based Service (ProSe): communication of device to device is studied for ProSe scenario, which mainly focuses on services for public security.

Vehicle to Everything (V2X): communication of device to device is studied for a communication scenario of vehicle to other device, which is mainly for services for communication of vehicle to vehicle moving at relatively high speed or communication of vehicle to pedestrian.

Further Enhancement Device to Device (FeD2D): communication of device to device is studied for a scenario that wearable devices access a network through mobile phones, which is mainly for scenarios of low mobile speed and low power access.

Second, change of access stratum configuration

For configuration of access stratum parameters (hereinafter referred to as access stratum configuration), a method centered on a transmitting end UE (that is, a terminal device as the transmitting end) is adopted.

When the transmitting end UE is in a scenario without cellular network coverage, the access stratum configuration is set according to a pre-configuration;

When the transmitting end UE is within the cellular network coverage, but is in an RRC idle state or an RRC inactive state, the access stratum configuration is set according to a configuration in a system message;

When the transmitting end UE is within the cellular network coverage and in an RRC connected state, the access stratum configuration is set according to a configuration in a dedicated RRC signaling.

When the transmitting end UE switches between different coverage scenarios or different RRC states, the access stratum configuration for the transmitting end UE may change, which will cause parameters for the transmitting end UE to change, and thus affect the normal communication at a receiving end UE. The following are some parameters that will affect the normal communication at the receiving end UE: Packet Data Convergence Protocol (PDCP) serial number size (PDCP SN Size), maximum context identification (MaxCID), out-of-order delivery (OutOfOrderDelivery), Radio Link Control (RLC) mode, RLC serial number field length (RLC SN field length) and logical channel identity (LogicalChannelIdentity).

The above parameters cannot be modified in real-time during data transmission, otherwise data transmission errors will be caused. Configuration of some parameters can only change based on PDCP reconstruction and/or data recovery. Configuration of some parameters can only change based on RLC reconstruction and/or MAC reset. Configuration of some parameters can only change when a bearer is established.

Therefore, it is necessary to define an operation of resetting configuration or configuration reset. Specifically, when the transmitting end UE switches between different coverage scenarios or different RRC states, the access stratum configuration changes, and the transmitting end UE transmits a reset configuration indication to the receiving end UE to trigger release of related bearer by the receiving end UE. However, after the receiving end UE releases the related bearer, how to ensure the normal communication between the receiving end UE and the transmitting end UE needs to be solved. In view of this, the following technical solution of the embodiments in the present disclosure is proposed. In the technical solution of the embodiments in the present disclosure, a mechanism of change of access stratum configuration is proposed.

Figure 3:
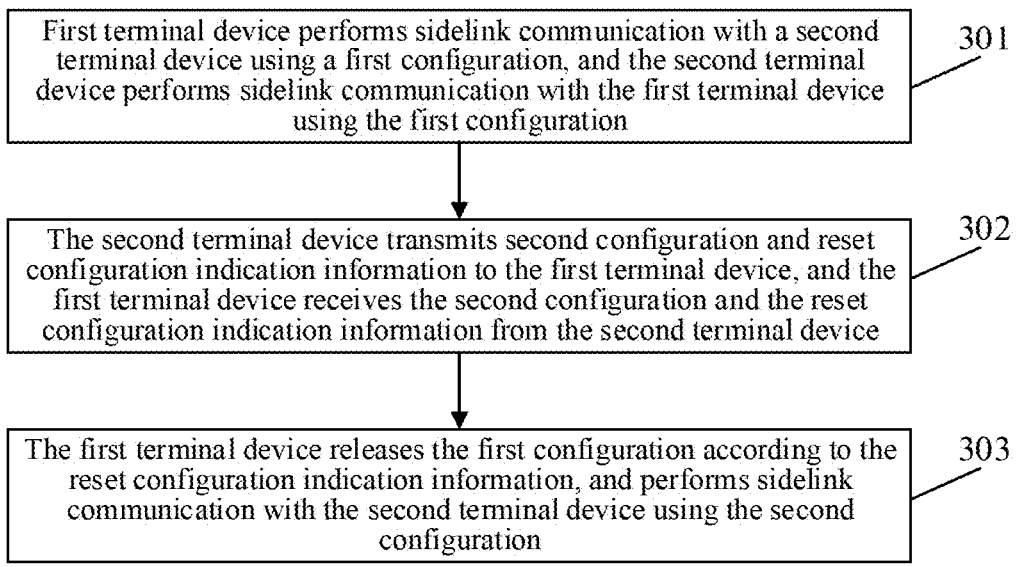
FIG. 3 is a first schematic flowchart of a method for resetting configuration provided by an embodiment of the present disclosure.

FIG. 3 is a schematic flowchart of a method for resetting configuration provided by an embodiment of the present disclosure. As illustrated in FIG. 3, the method for resetting configuration includes the following operations.

At block 301, the first terminal device performs sidelink communication with a second terminal device using a first configuration, and the second terminal device performs sidelink communication with the first terminal device using the first configuration.

In an embodiment of the present disclosure, the sidelink communication between the first terminal device and the second terminal device is realized based on the access stratum configuration. For a control plane, the access stratum configuration includes at least one of the following: RRC layer configuration, PDCP layer configuration, RLC layer configuration, MAC layer configuration or PHY layer configuration. For a user plane, the access stratum configuration includes at least one of the following: SDAP layer configuration, PDCP layer configuration, RLC layer configuration, MAC layer configuration or PHY layer configuration.

In an embodiment of the present disclosure, the first configuration is an access stratum configuration, and the first terminal device and the second terminal device use the first configuration for sidelink communication.

In an optional manner, the first configuration is acquired by the second terminal device from a first network or from a pre-configuration, and the second terminal device forwards the acquired first configuration to the first terminal device, thereby realizing the sidelink communication between the first terminal device and the second terminal device using the first configuration.

In an embodiment of the present disclosure, when the second terminal device switches between different coverage scenarios or different RRC states, the access stratum configuration changes, for example, from the first configuration to a second configuration. In this case, the second terminal device transmits the second configuration and reset configuration indication information to the first terminal device, and reference is made to block 302 below.

At block 302, the second terminal device transmits the second configuration and the reset configuration indication information to the first terminal device, and the first terminal device receives the second configuration and the reset configuration indication information from the second terminal device.

In an embodiment of the present disclosure, the reset configuration indication information is used for indicating the first terminal device to release the first configuration, and the second configuration is used for the first terminal device to perform sidelink communication with the second terminal device.

In an embodiment of the present disclosure, the second configuration and the reset configuration indication information is transmitted through a PC5-RRC message between the second terminal device and the first terminal device. Specifically, the second terminal device transmits the PC5-RRC message to the first terminal device, and the first terminal device receives the PC5-RRC message from the second terminal device. The PC5-RRC message carries the second configuration and the reset configuration indication information.

In an embodiment of the present disclosure, when the second terminal device switches between different coverage scenarios or different RRC states, the access stratum configuration changes, for example, from the first configuration to the second configuration. The second terminal device acquires the second configuration, and determines whether to perform reset configuration according to the first configuration and/or the second configuration. When determining that the reset configuration is to be performed, the second terminal device transmits the second configuration and the reset configuration indication information to the first terminal device.

The second terminal device may determine whether to perform reset configuration by comparing whether the first configuration is the same with the second configuration. Specifically, if all or part of parameter values of the second configuration are different from that of the first configuration, it is determined to perform reset configuration; if the second configuration is the same with the first configuration, it is determined not to perform reset configuration. In some embodiments, if the second configuration includes an indication for indicating the second terminal device to perform reset configuration, it is determined to perform reset configuration.

In an embodiment of the present disclosure, the second terminal device may acquire the second configuration in the following manners.

First manner: the second terminal device acquires the second configuration from a second network.

In an optional manner, when the second terminal device is in an RRC connected state, the second terminal device acquires the second configuration from a dedicated signaling sent by the second network. The dedicated signaling refers to the dedicated RRC signaling.

In an optional manner, when the second terminal device is in an RRC idle state or an RRC inactive state, the second terminal device acquires the second configuration from a system message sent by the second network.

In an optional manner, the second terminal device acquires a second configuration from a saved configuration, the second configuration being previously acquired by the second terminal device from the second network.

Second manner: the second terminal device acquires the second configuration from a pre-configuration.

In an optional manner, the second terminal device acquires the first configuration in a different manner than the second configuration.

In an example, when the second terminal device is located within the coverage of the second network, the second terminal device acquires the first configuration from the second network. When the second terminal device moves out of the coverage of the second network, the second terminal device acquires the second configuration from the pre-configuration.

In an example, when the second terminal device is located outside the coverage of the second network, the second terminal device acquires the first configuration from the pre-configuration. When the second terminal device moves within the coverage of the second network, the second terminal device acquires the second configuration from the second network.

In an example, when the second terminal device is located within the coverage of the second network and is in an RRC idle state or an RRC inactive state, the second terminal device acquires the first configuration from a system message sent by the second network. When the second terminal device enters the RRC connected state from the RRC idle state or the RRC inactive state, the second terminal device acquires the second configuration from the dedicated signaling sent by the second network.

In an example, when the second terminal device is located within the coverage of the second network and is in an RRC connected state, the second terminal device acquires the first configuration from the dedicated signaling sent by the second network. When the second terminal device enters the RRC idle state or the RRC inactive state from the RRC connected state, the second terminal device acquires the second configuration from the system message sent by the second network.

In an optional manner, the second terminal device acquires the first configuration in the same manner than the second configuration.

In an example, when the second terminal device is located within the coverage of the second network and is in an RRC connected state, the second terminal device acquires the first configuration from a first dedicated signaling sent by the second network, and then the second terminal device acquires a second configuration from a second dedicated signaling sent by the second network.

In an embodiment of the present disclosure, after acquiring the second configuration, the second terminal device transmits the second configuration and the reset configuration indication information to the first terminal device.

In an optional manner, after receiving the second configuration and the reset configuration indication information from the second terminal device, the first terminal device transmits first indication information to the first network. The first indication information is used for indicating that the first terminal device has received the reset configuration indication information from the second terminal device, or the first indication information is the reset configuration indication information.

In some embodiments, the first indication information is carried in sidelink UE information.

In an embodiment of the present disclosure, the first terminal device performs sidelink communication with the second terminal device using the second configuration. Or, the first terminal device performs sidelink communication with the second terminal device using the second configuration and a third configuration. In some embodiments, the third configuration may also be referred to as a compatible configuration of the second configuration.

It should be noted that the second configuration is used for sidelink communication in a first direction, and the third configuration is used for sidelink communication in a second direction. The first direction refers to a transmission direction in which the second terminal device transmits to the first terminal device, and the second direction refers to a receiving direction in which the second terminal device receives from the first terminal device.

When the first terminal device needs to use the second configuration and the third configuration for sidelink communication with the second terminal device, the first terminal device needs to further acquire the third configuration.

In an embodiment of the present disclosure, the first terminal device may acquire the third configuration in the following manners.

Manner A: the first terminal device acquires the third configuration from the first network.

In an optional manner, when the first terminal device is in an RRC connected state, the first terminal device acquires the third configuration from a dedicated signaling sent by the first network.

In an optional manner, when the first terminal device is in an RRC idle state or an RRC inactive state, the first terminal device acquires the third configuration from a system message sent by the first network.

In an optional manner, the first terminal device acquires the third configuration from a saved configuration, the third configuration being previously acquired by the first terminal device from the first network. That is, the first terminal device may acquire the third configuration from the first network from locally stored content.

Manner B: the first terminal device acquires the third configuration from the pre-configuration.

It should be noted that pre-configured contents are also stored in the first terminal device.

In some embodiments, the third configuration in the above solution includes at least one of: configuration information for sidelink resource authorization or configuration information for sidelink bearer. Further, in some embodiments, the third configuration further includes second indication information, and the second indication information is used for indicating the first terminal device to establish a bearer between the first terminal device and the second terminal device.

At block 303, the first terminal device releases the first configuration according to the reset configuration indication information, and performs sidelink communication with the second terminal device using the second configuration.

In the embodiments of the present disclosure, the first terminal device releases the first configuration according to the reset configuration indication information. Further, the first terminal device releases a bearer between the first terminal device and the second terminal device according to the reset configuration indication information. It should be noted that the operation of releasing the first configuration and the related sidelink bearer by the first terminal device may be executed before the first terminal device reports the first indication information to the first network, or may be executed after the first terminal device reports the first indication information to the first network. For example, after receiving the reset configuration indication information, the first terminal device releases the first configuration and the related sidelink bearer, and then reports the first indication information to the first network. For another example, after receiving the reset configuration indication information, the first terminal device reports the first indication information to the first network, and then releases the first configuration and the related sidelink bearer.

In order to realize the normal sidelink communication between the first terminal device and the second terminal device, the first terminal device needs to establish the bearer between the first terminal device and the second terminal device. The bearer is established in the following manners.

Manner I: after acquiring the third configuration, the first terminal device establishes a first bearer and a second bearer between the first terminal device and the second terminal device according to the second configuration and the third configuration.

In this way, the first terminal device establishes the bearers (including the first bearer and the second bearer) between the first terminal device and the second terminal device after acquiring all the configurations (i.e., the second configuration and the third configuration).

Manner II: after acquiring the second configuration, the first terminal device establishes the first bearer between the first terminal device and the second terminal device according to the second configuration. After acquiring the third configuration, the first terminal device establishes the second bearer between the first terminal device and the second terminal device according to the third configuration.

It should be noted that if the third configuration is a configuration stored locally by the first terminal device, that is, the first terminal device acquires the third configuration by acquiring the third configuration from the pre-configuration, or by acquiring the third configuration from locally stored configurations from the second network. Then, the operation of establishing the bearer between the first terminal device and the second terminal device by the first terminal device may be executed before the first terminal device reports the first indication information to the first network, or may be executed after the first terminal device reports the first indication information to the first network. For example, after receiving the second configuration and the reset configuration indication information, the first terminal device establishes the bearer between the first terminal device and the second terminal device according to the second configuration and the locally stored third configuration, and then reports the first indication information to the first network. For another example, after receiving the second configuration and the reset configuration indication information, the first terminal device reports the first indication information to the first network, and then establishes the bearer between the first terminal device and the second terminal device according to the second configuration and the locally stored third configuration.

In this way, after acquiring the second configuration, the first terminal device establishes the first bearer between the first terminal device and the second terminal device. After acquiring the third configuration, the first terminal device continues to establish the second bearer between the first terminal device and the second terminal device.

It should be noted that the first bearer is used for sidelink communication in a first direction, and the second bearer is used for sidelink communication in a second direction. The first direction refers to a transmission direction in which the second terminal device transmits to the first terminal device, and the second direction refers to a receiving direction in which the second terminal device receives from the first terminal device.

The technical solution of the embodiments of the present disclosure provides a mechanism of change of access stratum configuration, which is used for smoothly updating the configuration when the terminal device switches between different coverage or different RRC states.

The technical solution of the embodiments of the present disclosure is illustrated exemplarily in combination with specific application examples. It should be noted that in the following application example, UE1 corresponds to the second terminal device in the above solution, and UE2 corresponds to the first terminal device in the above solution. Network 1 corresponds to a second network in the above solution and network 2 corresponds to a first network in the above solution.

First Application Example

Figure 4:
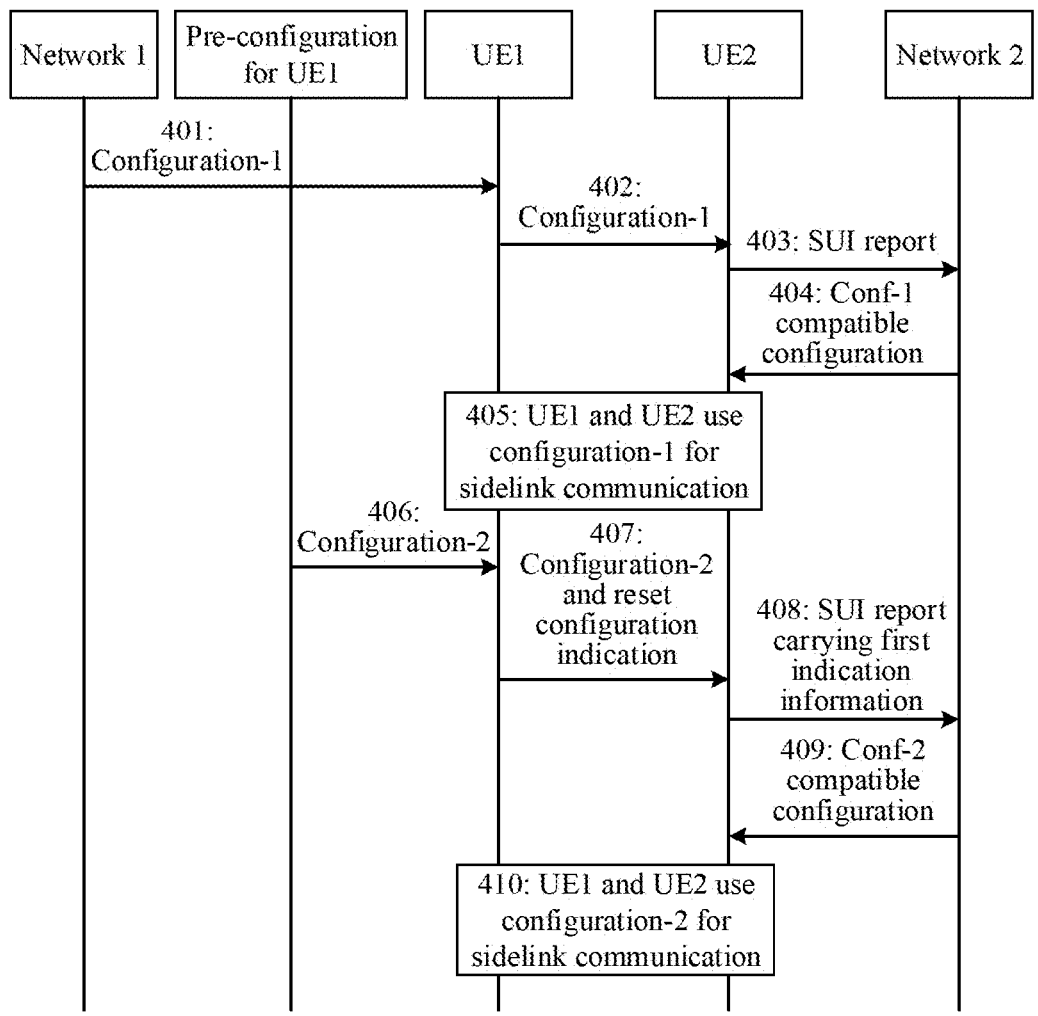
FIG. 4 is a second schematic flowchart of a method for resetting configuration provided by an embodiment of the present disclosure.

Referring to FIG. 4, the process of resetting configuration of the application example includes the following operations.

In operation 401, UE1 acquires configuration-1 from a system message sent from network 1.

In operation 402, the UE1 transmits the configuration-1 to UE2.

Here, the UE1 transmits the configuration-1 to the UE2 through a PC5-RRC message. The configuration-1 belongs to the access stratum configuration. Specifically, the UE1 transmits related parameters of the configuration-1 to the UE2 through the PC5-RRC message.

In operation 403, the UE2 transmits a sidelink UE information report (SUI report) to a network 2.

In operation 404, the network 2 transmits a compatible configuration of the configuration-1 (i.e., conf-1 compatible configuration) to UE2.

In operation 405, the UE1 and the UE2 use the configuration-1 for sidelink communication.

Here, the UE2 performs sidelink communication using the configuration-1 and the conf-1 compatible configuration.

It should be noted that the conf-1 is used for sidelink communication in a first direction, and the conf-1 compatible configuration is used for sidelink communication in a second direction. The first direction refers to a direction of transmission from the UE1 to the UE2, and the second direction refers to a direction of reception in which the UE1 receives from the UE2.

In operation 406, when the UE1 moves out of the coverage of the network 1, the UE1 acquires configuration-2 from the pre-configuration.

In operation 407, the UE1 transmits the configuration-2 and a reset configuration indication to the UE2.

Here, the UE1 determines whether to perform reset configuration according to contents of the configuration-1 and the configuration-2. For example, if it is determined that there is a parameter to be reset according to the contents of configuration-1 and configuration-2, it is determined to perform reset configuration. In some embodiments, the reset configuration indication may be implemented by sl-Reset-Config.

Here, the UE1 transmits the configuration-2 and the reset configuration indication to the UE2 through a PC5-RRC message. The configuration-2 belongs to the access stratum configuration.

The UE2 releases the configuration-1 and the conf-1 compatible configuration according to the reset configuration indication, and releases the related sidelink bearer.

In operation 408, the UE2 transmits a sidelink UE information report (SUI report) to the network 2. The SUI report carries first indication information, and the first indication information is used for indicating that the UE2 has received a reset configuration indication or the first indication information is the reset configuration indication.

In operation 409, the network 2 transmits a compatible configuration of the configuration-2 (i.e., conf-2 compatible configuration) to UE2.

Here, the conf-2 compatible configuration includes configuration information for sidelink resource authorization and configuration information for sidelink bearer. In some embodiments, the conf-2 compatible configuration further includes second indication information, and the second indication information is used to indicate the UE2 to re-establish the related sidelink bearer.

The UE2 establishes the sidelink bearer according to the configuration-2 and the conf-2 compatible configuration. Or, the UE2 first establishes a part of sidelink bearer after acquiring the configuration-2, and the UE2 establishes the other part of sidelink bearer after acquiring the conf-2 compatible configuration.

In operation 410, the UE1 and the UE2 use the configuration-2 for sidelink communication.

Here, the UE2 performs sidelink communication using the configuration 2 and the conf-2 compatible configuration.

It should be noted that the configuration-2 is used for sidelink communication in a first direction, and the conf-2 compatible configuration is used for sidelink communication in a second direction. The first direction refers to a direction of transmission from the UE1 to the UE2, and the second direction refers to a receiving direction in which the UE1 receives from the UE2.

Second Application Example

Figure 5:
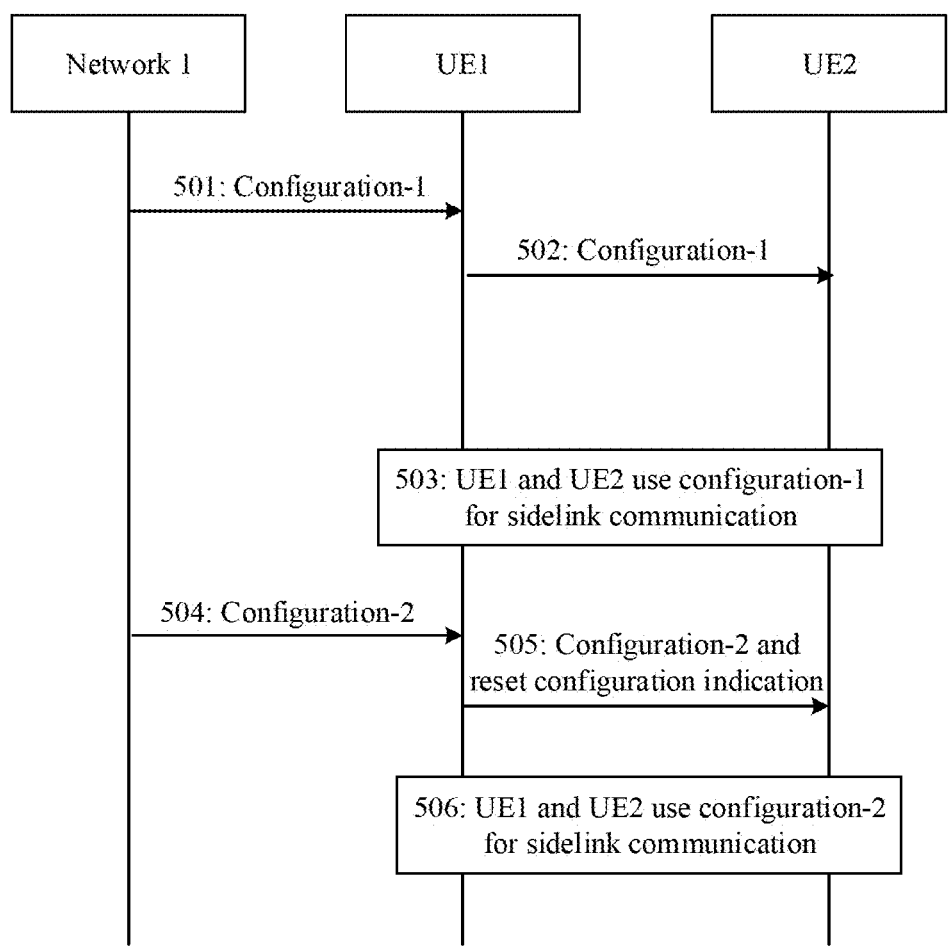
FIG. 5 is a third schematic flowchart of a method for resetting configuration provided by an embodiment of the present disclosure.

Referring to FIG. 5, the process of resetting configuration of the application example includes the following operations.

In operation 501, UE1 acquires configuration-1 in a dedicated signaling sent from a network 1.

In operation 502, the UE1 transmits the configuration-1 to the UE2.

Here, the UE1 transmits the configuration-1 to the UE2 through a PC5-RRC message. The configuration-1 belongs to the access stratum configuration. Specifically, the UE1 transmits related parameters of the configuration-1 to the UE2 through the PC5-RRC message.

In operation 503, the UE1 and the UE2 use the configuration-1 for sidelink communication.

In operation 504, the UE1 acquires configuration-2 in the dedicated signaling sent from the network 1.

In operation 505, the UE1 transmits the configuration-2 and a reset configuration indication to the UE2.

Here, UE1 determines whether to perform reset configuration according to contents of the configuration-1 and the configuration-2. For example, if it is determined that there is a parameter to be reset according to the contents of the configuration-1 and the configuration-2, it is determined to perform reset configuration. In some embodiments, the reset configuration indication may be implemented by sl-Reset-Config.

Here, the UE1 transmits the configuration-2 and the reset configuration indication to the UE2 through a PC5-RRC message. The configuration-2 belongs to the access stratum configuration.

The UE 2 releases the configuration-1 according to the reset configuration indication, and releases the related sidelink bearer.

The UE2 re-establishes the related sidelink bearer according to the configuration-2.

In operation 506, the UE1 and the UE2 use the configuration-2 for sidelink communication.

Figure 6:
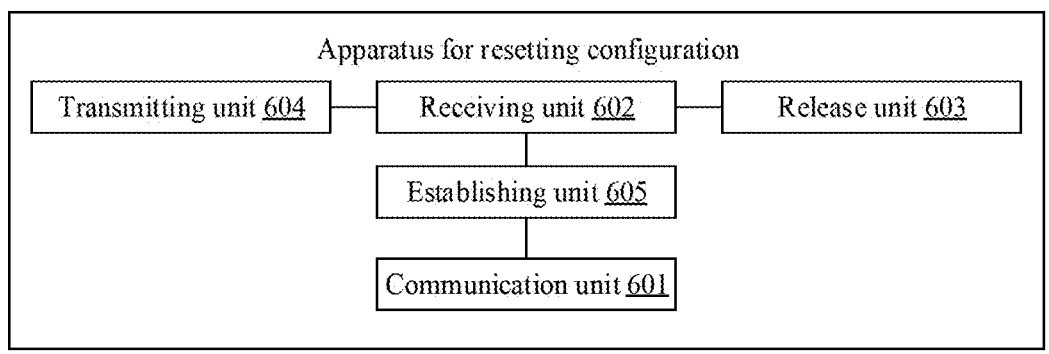
FIG. 6 is a first structural composition diagram of an apparatus for resetting configuration provided by an embodiment of the present disclosure.

FIG. 6 is a first structural composition diagram of an apparatus for resetting configuration provided by an embodiment of the present disclosure, and the apparatus for resetting configuration is applied to a first terminal device. As illustrated in FIG. 6, the apparatus for resetting configuration includes a communication unit 601, a receiving unit 602, and a release unit 603.

The communication unit 601 is configured to perform sidelink communication with a second terminal device using a first configuration.

The receiving unit 602 is configured to receive a second configuration and reset configuration indication information from the second terminal device.

The release unit 603 is configured to release the first configuration according to the reset configuration indication information.

The communication unit 601 is further configured to perform sidelink communication with the second terminal device using the second configuration.

In an optional manner, the apparatus further includes a transmitting unit 604.

The transmitting unit 604 is configured to transmit first indication information to a first network. The first indication information is used for indicating that the first terminal device has received the reset configuration indication information from the second terminal device, or the first indication information is the reset configuration indication information.

In an optional manner, the apparatus further includes an acquiring unit (not illustrated in the FIG. 6).

The acquiring unit is configured to acquire a third configuration.

The communication unit 601 is configured to perform sidelink communication with the second terminal device using the second configuration and the third configuration.

In an optional manner, the acquiring unit is configured to acquire the third configuration from a first network.

In an optional manner, the acquiring unit is configured to acquire the third configuration from a pre-configuration.

In an optional manner, the acquiring unit is configured to acquire the third configuration from a saved configuration, the third configuration being previously acquired by the first terminal device from the first network.

In an optional manner, the acquiring unit is configured to acquire the third configuration from a dedicated signaling sent by the first network.

In an optional manner, the acquiring unit is configured to acquire the third configuration from a system message sent by the first network.

In an optional manner, the third configuration includes at least one of:

configuration information for sidelink resource authorization or configuration information for sidelink bearer.

In an optional manner, the second configuration is used for sidelink communication in a first direction, and the third configuration is used for sidelink communication in a second direction. The first direction refers to a direction in which the second terminal device transmits to the first terminal device, and the second direction refers to a direction in which the second terminal device receives from the first terminal device.

In an optional manner, the apparatus further includes an establishing unit 605.

The establishing unit 605 is configured to establish a first bearer and a second bearer between the first terminal device and the second terminal device according to the second configuration and the third configuration after the third configuration is acquired.

In an optional manner, the apparatus further includes the establishing unit 605.

The establishing unit 605 is configured to establish a first bearer between the first terminal device and the second terminal device according to the second configuration after the second configuration is acquired, and establish a second bearer between the first terminal device and the second terminal device according to the third configuration after the third configuration is acquired.

In an optional manner, the first bearer is used for sidelink communication in a first direction, and the second bearer is used for sidelink communication in a second direction. The first direction refers to a transmission direction from the second terminal device to the first terminal device, and the second direction refers to a receiving direction from the first terminal device to the second terminal device.

In an optional manner, the receiving unit 602 is configured to receive a PC5-RRC message from the second terminal device, the PC5-RRC message carrying the second configuration and the reset configuration indication information.

It should be understood by those skilled in the art that the above description of the apparatus for resetting configuration of the embodiment of the present disclosure may be understood with reference to the description of the method for resetting configuration of the embodiment of the present disclosure.

Figure 7:
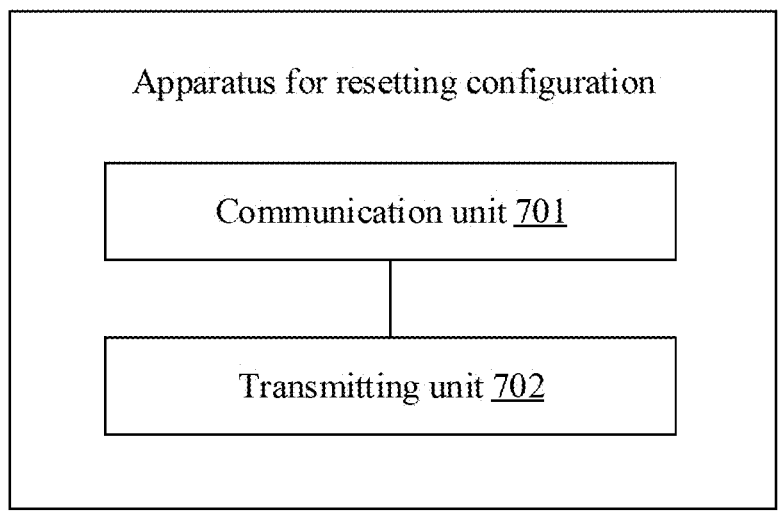
FIG. 7 is a second structural composition diagram of an apparatus for resetting configuration provided by an embodiment of the present disclosure.

FIG. 7 is a second structural composition diagram of an apparatus for resetting configuration provided by an embodiment of the present disclosure, and the apparatus for resetting configuration is applied to a second terminal device. As illustrated in FIG. 7, the apparatus for resetting configuration includes a communication unit 701 and a transmitting unit 702.

The communication unit 701 is configured to perform sidelink communication with a first terminal device using a first configuration.

The transmitting unit 702 is configured to transmit a second configuration and reset configuration indication information to the first terminal device.

The reset configuration indication information is used for indicating the first terminal device to release the first configuration, and the second configuration is used for the first terminal device to perform sidelink communication with the second terminal device.

In an optional manner, the apparatus further includes an acquiring unit and a determining unit (not illustrated in the FIG. 7).

The acquiring unit is configured to acquire the second configuration.

The determining unit is configured to determine whether to perform reset configuration according to the first configuration and the second configuration.

The transmitting unit 702 is configured to transmit the second configuration and the reset configuration indication information to the first terminal device in response to determining to perform reset configuration.

In an optional manner, the acquiring unit is configured to acquire the second configuration from a second network.

In an optional manner, the acquiring unit is configured to acquire the second configuration from a pre-configuration.

In an optional manner, the acquiring unit is configured to acquire the second configuration from a saved configuration, the second configuration being previously acquired by the second terminal device from the second network.

In an optional manner, the acquiring unit is configured to acquire the second configuration in a dedicated signaling sent by the second network.

In an optional manner, the acquiring unit is configured to acquire the second configuration in a system message sent by the second network.

In an optional manner, the transmitting unit 702 is configured to transmit a PC5-RRC message to the first terminal device, the PC5-RRC message carrying the second configuration and the reset configuration indication information.

It should be understood by those skilled in the art that the above description of the apparatus for resetting configuration of the embodiment of the present disclosure may be understood with reference to the description of the method for resetting configuration of the embodiment of the present disclosure.

Figure 8:
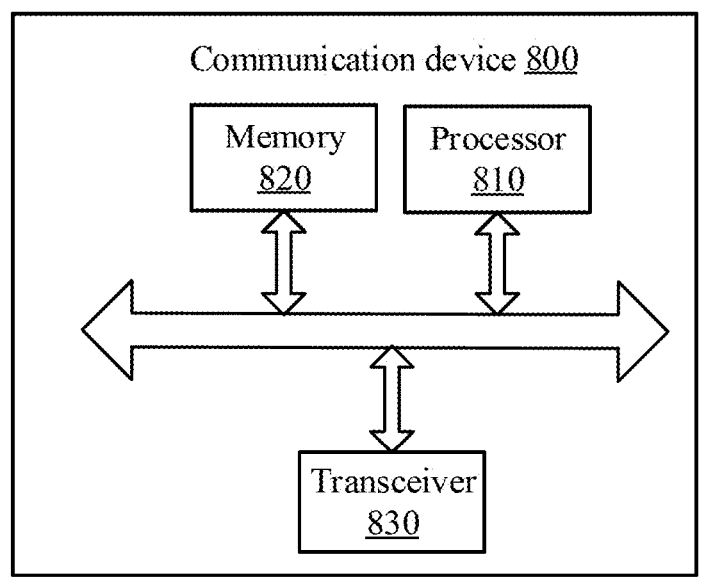
FIG. 8 is a schematic structural diagram of a communication device provided by an embodiment of the present disclosure.

FIG. 8 is a schematic structural diagram of a communication device 800 provided by an embodiment of the present disclosure. The communication device may be a terminal device or a network device, and the communication device 800 illustrated in FIG. 8 includes a processor 810 that may call and execute a computer program from a memory to implement the method in the embodiments of the present disclosure.

In some embodiments, as illustrated in FIG. 8, the communication device 800 may also include a memory 820. The processor 810 can call and execute a computer program from the memory 820 to implement the method in the embodiments of the present disclosure.

The memory 820 may be a separate device independent of the processor 810 or may be integrated in the processor 810.

In some embodiments, as illustrated in FIG. 8, the communication device 800 may also include a transceiver 830. The processor 810 may control the transceiver 830 to communicate with other devices, and in particular send information or data to other devices, or receive information or data sent by other devices.

The transceiver 830 may include a transmitter and a receiver. The transceiver 830 may further include antennas. The number of antennas may be one or more.

In some embodiments, the communication device 800 may be specifically a network device of the embodiments of the present disclosure, and the communication device 800 may implement corresponding processes implemented by the network device in various methods of the embodiments of the present disclosure, which will not be repeated here for the sake of brevity.

In some embodiments, the communication device 800 may be specifically a mobile terminal/terminal device of the embodiments of the present disclosure, and the communication device 800 may implement corresponding processes implemented by the mobile terminal/the terminal device in various methods of the embodiments of the present disclosure, which will not be repeated here for the sake of brevity.

Figure 9:
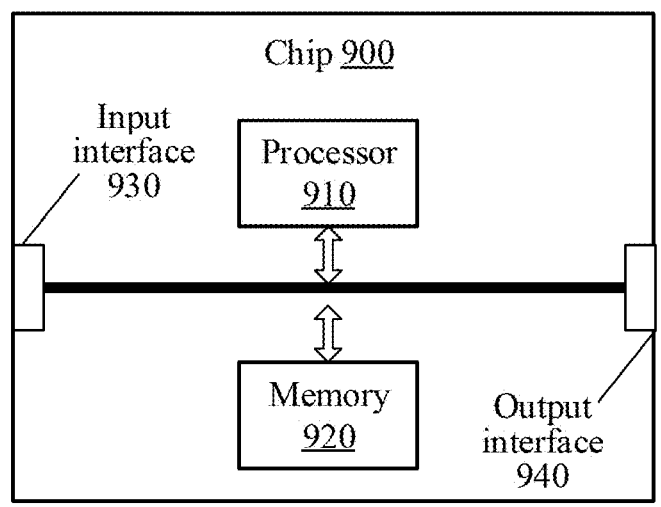
FIG. 9 is a schematic structural diagram of a chip according to an embodiment of the present disclosure.

FIG. 9 is a schematic structural diagram of a chip according to an embodiment of the present disclosure. A chip 900 illustrated in FIG. 9 includes a processor 910 that may call and execute a computer program from a memory to implement the method in the embodiments of the present disclosure.

In some embodiments, as illustrated in FIG. 9, the chip 900 may also include a memory 920. The processor 910 may call and execute a computer program from the memory 920 to implement the method in the embodiments of the present disclosure.

The memory 920 may be a separate device independent of the processor 910 or may be integrated in the processor 910.

In some embodiments, the chip 900 may also include an input interface 930. The processor 910 may control the input interface 930 to communicate with other devices or chips, and in particular obtain information or data sent by other devices or chips.

In some embodiments, the chip 900 may also include an output interface 940. The processor 910 may control the output interface 940 to communicate with other devices or chips, and in particular output information or data to other devices or chips.

In some embodiments, the chip may applied to be a network device of the embodiments of the present disclosure, and the chip may implement corresponding processes implemented by the network device in various methods of the embodiments of the present disclosure, which will not be repeated here for the sake of brevity.

In some embodiments, the chip may applied to be a mobile terminal/terminal device of an embodiment of the present disclosure, and the chip may implement corresponding processes implemented by the mobile terminal/the terminal device in the respective methods of the embodiments of the present disclosure, which will not be repeated here for the sake of brevity.

It should be understood that the chip referred to in the embodiments of the present disclosure may also be referred to as a system-level chip, a system chip, a chip system or a system-on-chip or the like.

Figure 10:
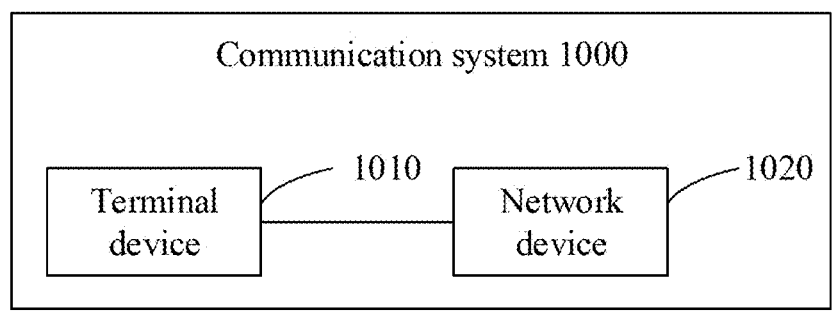
FIG. 10 is a schematic block diagram of a communication system provided by an embodiment of the present disclosure.

FIG. 10 is a schematic block diagram of a communication system 1000 provided by an embodiment of the present disclosure. As illustrated in FIG. 10, the communication system 1000 includes a terminal device 1010 and a network device 1020.

The terminal device 1010 may be configured to implement corresponding functions implemented by the terminal device in the above method, and the network device 1020 may be configured to implement corresponding functions implemented by the network device in the above method, which will not be repeated here for the sake of brevity.

It should be understood that the processor may be an integrated circuit chip having signal processing capability. In implementation, the operations of the above method embodiments may be accomplished by integrated logic circuitry of hardware in processor or instructions in the form of software. The processor may be a general purpose processor, a digital signal processor (DSP), an application specific integrated circuit (ASIC), a field programmable gate array (FPGA) or other programmable logic devices, discrete gates or transistor logic devices, or discrete hardware components. The processor may implement or execute the methods, operations and logic diagrams disclosed in the embodiments of the present disclosure. The general purpose processor can be a microprocessor or any conventional processor. The operations of the method disclosed in the embodiments of the present disclosure may be directly embodied as being executed by a hardware decoding processor or being executed by the hardware and software modules in a decoding processor. The software modules may be located in a random access memory, a flash memory, a read-only memory, a programmable read-only memory or an electrically erasable programmable memory, a register and other mature storage media in the art. The storage medium is located in the memory, and the processor reads the information in the memory to complete the operations of the aforementioned method in conjunction with its hardware.

It will be appreciated that the memory in the embodiments of the present disclosure may be a volatile memory or a non-volatile memory, or may also include both a volatile memory and a non-volatile memory. The non-volatile memory may be a read-only memory (ROM), a programmable ROM (PROM), an erasable PROM (EPROM), an electrically EPROM (EPROM) or a flash memory. The volatile memory may be a random access memory (RAM), which serves as an external cache. By way of illustration but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), a direct rambus RAM (DR RAM). It should be noted that the memory in the systems and methods described herein is intended to include, but is not limited to, these memories and any other suitable types of memory.

It should be understood that the memory described above is exemplary but not limiting. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), a direct rambus RAM (DR RAM), etc. That is, the memory in the embodiments of the present disclosure is intended to include, but is not limited to, these memories and any other suitable types of memory.

In an embodiment of the present disclosure, there is further provided a computer-readable storage medium, configured to store a computer program.

In some embodiments, the computer-readable storage medium may applied to the network device of the embodiments of the present disclosure, and the computer program causes a computer to implement corresponding processes implemented by the network device in the methods of the embodiments of the present disclosure, which will not be repeated here for the sake of brevity.

In some embodiments, the computer-readable storage medium may applied to the mobile terminal/terminal device of the embodiments of the present disclosure, and the computer program causes a computer to implement corresponding processes implemented by the mobile terminal/terminal device in the methods of the embodiments of the present disclosure, which will not be repeated here for the sake of brevity.

In an embodiment of the present disclosure, there is further provided a computer program product, which includes computer program instructions.

In some embodiments, the computer program product may applied to the network device of the embodiments of the present disclosure, and the computer program instructions cause a computer to implement corresponding processes implemented by the network device in the methods of the embodiments of the present disclosure, which will not be repeated here for the sake of brevity.

In some embodiments, the computer program product may applied to the mobile terminal/terminal device of the embodiments of the present disclosure, and the computer program instructions causes a computer to implement corresponding processes implemented by the mobile terminal/terminal device in the methods of the embodiments of the present disclosure, which will not be repeated here for the sake of brevity.

In an embodiment of the present disclosure, there is further provided a computer program.

In some embodiments, the computer program may applied to the network device of the embodiments of the present disclosure, the computer program, when running on a computer, causes the computer to implement corresponding processes implemented by the network device in the methods of the embodiments of the present disclosure, which will not be repeated here for the sake of brevity.

In some embodiments, the computer program may applied to the mobile terminal/terminal device of the embodiments of the present disclosure, the computer program, when running on a computer, causes the computer to implement corresponding processes implemented by the mobile terminal/terminal device in the methods of the embodiments of the present disclosure, which will not be repeated here for the sake of brevity.

According to the technical solution, when an access stratum configuration for the second terminal device changes from the first configuration to the second configuration, the second terminal device transmits the second configuration and the reset configuration indication information to the first terminal device. The first terminal device releases the first configuration according to the reset configuration indication information and performs sidelink communication with the second terminal device using the second configuration. In this way, when the access stratum configuration for the second terminal device is changed, the first terminal device can be ensured to communicate normally.

Those of ordinary skill in the art may realize that the various example units and algorithm steps described in connection with the embodiments disclosed herein can be implemented in electronic hardware or a combination of computer software and electronic hardware. Whether these functions are performed in hardware or software depends on the specific application and design constraints of the technical solution. Professionals can use different methods for each particular application to implement the described functionality, but such implementation should not be considered beyond the scope of the present disclosure.

Those skilled in the art will clearly appreciate that, for convenience and conciseness of description, the specific operating processes of the above-described systems, apparatuses and units may refer to the corresponding processes in the aforementioned method embodiments and will not be repeated herein.

In several embodiments provided herein, it should be understood that the disclosed systems, apparatuses and methods may be implemented in other manners. For example, the above-described embodiments of the apparatus is only schematic, for example, the division of the units is only a logical function division, and in practice, there may be another division manner, for example, multiple units or components may be combined or integrated into another system, or some features may be ignored or not performed. On the other hand, the coupling or direct coupling or communication connection between each other illustrated or discussed may be indirect coupling or communication connection through some interfaces, devices or units, and may be electrical, mechanical or other form.

The units illustrated as separate elements may or may not be physically separated, and the elements displayed as units may or may not be physical units, i.e. may be located in a place, or may be distributed over a plurality of network units. Part or all of the units can be selected according to the actual needs to achieve the purpose of the embodiments of the present disclosure.

In addition, each functional unit in each embodiment of the present disclosure may be integrated in one processing unit, each unit may exist physically alone, or two or more units may be integrated in one unit.

When the functions are realized in the form of software functional units and sold or used as an independent product, they may be stored in a computer readable storage medium. Based on such an understanding, the technical solutions according to the disclosure, in essence or the part contributing to the prior art, or part of the technical solutions can be embodied in the form of a software product. The computer software product is stored in a storage medium, and includes several instructions so that a computer device (which may be a personal computer, a server, a network device or the like) implements all or part of the method according to respective embodiments of the disclosure. The aforementioned storage medium includes various media capable of storing a program code such as a USB disk, a mobile hard drive disk, a read-only memory (ROM), a random access memory (RAM), a magnetic disk or an optical disk.

The above is only the specific implementation of the present disclosure, but the scope of protection of the present disclosure is not limited thereto. Any person skilled in the art can easily think of changes or substitutions within the technical scope disclosed in the present disclosure, which should be covered within the protection scope of the present disclosure. Therefore, the scope of protection of the present disclosure shall be subject to the scope of protection of the claims.

The invention claimed is:

1. A method for resetting configuration, comprising:
    performing, by a first terminal device, sidelink communication with a second terminal device using a first configuration;
    receiving, by the first terminal device, a second configuration and reset configuration indication information from the second terminal device, wherein the second configuration is used for sidelink communication in a first direction; and
    releasing, by the first terminal device, the first configuration according to the reset configuration indication information, and performing, by the first terminal device, sidelink communication with the second terminal device using the second configuration,
    the method further comprising:
    acquiring, by the first terminal device, a third configuration from a first network, wherein the third configuration is used for sidelink communication in a second direction and the third configuration comprises configuration information for sidelink resource authorization; and
    establishing, by the first terminal device, a first bearer between the first terminal device and the second terminal device according to the second configuration, and establishing, by the first terminal device, a second bearer between the first terminal device and the second terminal device according to the third configuration, wherein the first bearer is used for sidelink communication in the first direction, and the second bearer is used for sidelink communication in the second direction, the first direction being a transmission direction in which the second terminal device transmits to the first terminal device, and the second direction being a receiving direction in which the second terminal device receives from the first terminal device, wherein performing, by the first terminal device, sidelink communication with the second terminal device using the second configuration comprises:

performing, by the first terminal device, sidelink communication with the second terminal device using the second configuration and the third configuration.

2. The method of claim 1, wherein acquiring, by the first terminal device, the third configuration from the first network comprises:

acquiring, by the first terminal device, the third configuration from a saved configuration, wherein the third configuration is acquired by the first terminal device from the first network.

3. The method of claim 1, wherein receiving, by the first terminal device, the second configuration and the reset configuration indication information from the second terminal device comprises:

receiving, by the first terminal device, a PC5-RRC message from the second terminal device, wherein the PC5-RRC message carries the second configuration and the reset configuration indication information.

4. An apparatus for resetting configuration, applied to a first terminal device, the apparatus comprising: a processor and a transceiver, wherein the processor is configured to control the transceiver to:

perform sidelink communication with a second terminal device using a first configuration;

receive a second configuration and reset configuration indication information from the second terminal device, wherein the second configuration is used for sidelink communication in a first direction; and release the first configuration according to the reset configuration indication information;

wherein the transceiver is further configured to perform sidelink communication with the second terminal device using the second configuration, wherein the transceiver is further configured to:

acquire a third configuration from a first network, wherein the third configuration is used for sidelink communication in a second direction and the third configuration comprises configuration information for sidelink resource authorization;

establish a first bearer between the first terminal device and the second terminal device according to the second configuration, and establish a second bearer between the first terminal device and the second terminal device according to the third configuration, wherein the first bearer is used for sidelink communication in the first direction, and the second bearer is used for sidelink communication in the second direction, the first direction being a transmission direction in which the second terminal device transmits to the first terminal device, and the second direction being a receiving direction in which the second terminal device receives from the first terminal device, wherein the transceiver is further configured to:

perform sidelink communication with the second terminal device using the second configuration and the third configuration.

5. The apparatus of claim 4, wherein the transceiver is configured to acquire the third configuration from a saved configuration, wherein the third configuration is acquired by the first terminal device from the first network.

6. The apparatus of claim 4, wherein the transceiver is configured to receive a PC5-RRC message from the second terminal device, wherein the PC5-RRC message carries the second configuration and the reset configuration indication information.

7. The apparatus of claim 6, wherein the transceiver is configured to transmit a PC5-RRC message to the first terminal device, wherein the PC5-RRC message carries second configuration and the reset configuration indication information.

8. An apparatus for resetting configuration, applied to a second terminal device, the apparatus comprising: a processor and a transceiver, wherein the processor is configured to control the transceiver to:

perform sidelink communication with a first terminal device using a first configuration; and transmit a second configuration and reset configuration indication information to the first terminal device, wherein the second configuration is used for sidelink communication in a first direction;

wherein the reset configuration indication information is used for indicating the first terminal device to release the first configuration, and the second configuration is used for the first terminal device to perform sidelink communication with the second terminal device, wherein a first bearer is established between the first terminal device and the second terminal device according to the second configuration, and a second bearer is established between the first terminal device and the second terminal device according to a third configuration from a first network, wherein the third configuration is used for sidelink communication in a second direction and the third configuration comprises configuration information for sidelink resource authorization, wherein the first bearer is used for sidelink communication in the first direction, and the second bearer is used for sidelink communication in the second direction, the first direction being a transmission direction in which the second terminal device transmits to the first terminal device, and the second direction being a receiving direction in which the second terminal device receives from the first terminal device, and wherein the second configuration and the third configuration are used for the first terminal device to perform sidelink communication with the second terminal device.

9. The apparatus of claim 8, wherein the transceiver is further configured to:

acquire the second configuration; and the processor is configured to determine whether to perform reset configuration according to the first configuration and the second configuration;

wherein the transceiver is configured to transmit the second configuration and the reset configuration indication information to the first terminal device in response to determining to perform reset configuration.

10. The apparatus of claim 9, wherein the transceiver is configured to acquire the second configuration from a second network.

* * * * *